US012480703B2

(12) United States Patent
Boyles

(10) Patent No.: US 12,480,703 B2
(45) Date of Patent: Nov. 25, 2025

(54) FOOD FREEZER WITH INTERNAL EXHAUST

(71) Applicant: Messer Industries USA, Inc., Bridgewater, NJ (US)

(72) Inventor: Scott Boyles, Telford, PA (US)

(73) Assignee: Messer Industries USA, Inc., New Castle, DE (US)

( * ) Notice: Subject to any disclaimer, the term of this patent is extended or adjusted under 35 U.S.C. 154(b) by 0 days.

(21) Appl. No.: 16/638,788

(22) PCT Filed: Aug. 17, 2018

(86) PCT No.: PCT/US2018/046858
§ 371 (c)(1),
(2) Date: Feb. 13, 2020

(87) PCT Pub. No.: WO2019/036574
PCT Pub. Date: Feb. 21, 2019

(65) Prior Publication Data
US 2020/0182531 A1 Jun. 11, 2020

Related U.S. Application Data

(60) Provisional application No. 62/547,244, filed on Aug. 18, 2017.

(51) Int. Cl.
*F25D 23/02* (2006.01)
*A23B 2/88* (2025.01)
(Continued)

(52) U.S. Cl.
CPC .............. *F25D 23/023* (2013.01); *A23B 2/88* (2025.01); *F25D 13/067* (2013.01); *F25D 25/04* (2013.01)

(58) Field of Classification Search
CPC ...... F25D 23/023; F25D 13/067; F25D 25/04; F25D 3/11; A23L 3/375
See application file for complete search history.

(56) References Cited

U.S. PATENT DOCUMENTS 3,255,608 A * 6/1966 Macintosh ................ F25D 3/11
62/374
3,698,205 A * 10/1972 Perez .................... A47F 3/0452
62/256
(Continued)

FOREIGN PATENT DOCUMENTS

| CN | 104634037 A | 5/2015 |
| JP | H0799950 A | 4/1995 |
| WO | 2013034826 A1 | 3/2013 |

OTHER PUBLICATIONS

PCT International Search Report for PCT/US18/46858, mailed Oct. 25, 2018, Authorized Officer: Shane Thomas, 4 pgs.
(Continued)

*Primary Examiner* — David J Teitelbaum
(74) *Attorney, Agent, or Firm* — Joshua L. Cohen

(57) ABSTRACT

A food freezer includes: a first housing having a first chamber arranged internally within for providing a freezing gas to a food product within the first chamber; a second housing having a second chamber arranged internally within and being in fluid communication with the first chamber for exhausting the freezing gas from the first chamber; an adjustable opening disposed at a common wall between the first chamber and the second chamber for controlling a flow of the freezing gas moving from the first chamber to the second chamber, the adjustable opening disposed to provide a flow path for the flow of the freezing gas to a region of the second chamber for exhaust from said second chamber to an area external to the first housing and second housing; and a pressure curtain comprising the exhaust and disposed at the
(Continued)

second chamber to prevent atmosphere from the area external to the first housing and second housing from entering said housings. A related method of exhausting freezing gas is also provided.

12 Claims, 2 Drawing Sheets

(51) Int. Cl.
  *F25D 13/06* (2006.01)
  *F25D 25/04* (2006.01)

(56) References Cited

U.S. PATENT DOCUMENTS

| | | | | |
|---|---|---|---|---|
| 3,871,190 A | * | 3/1975 | Harper | F25D 3/11 |
| | | | | 62/380 |
| 3,914,953 A | | 10/1975 | Miller | |
| RE28,712 E | * | 2/1976 | Klee | F25D 3/11 |
| | | | | 62/216 |
| 4,783,972 A | * | 11/1988 | Tyree, Jr. | F25D 3/11 |
| | | | | 236/49.3 |
| 4,852,358 A | * | 8/1989 | Acharya | A23L 3/361 |
| | | | | 62/63 |
| 4,858,445 A | * | 8/1989 | Rasovich | F25D 16/00 |
| | | | | 62/332 |
| 5,966,946 A | * | 10/1999 | Girard | F25D 29/001 |
| | | | | 62/186 |
| 2005/0235676 A1 | * | 10/2005 | Kamm | F25D 3/11 |
| | | | | 62/380 |
| 2016/0101674 A1 | | 4/2016 | Rivière et al. | |

OTHER PUBLICATIONS

PCT Written Opinion for PCT/US18/46858, mailed Oct. 25, 2018, Authorized Officer: Shane Thomas, 6 pgs.

\* cited by examiner

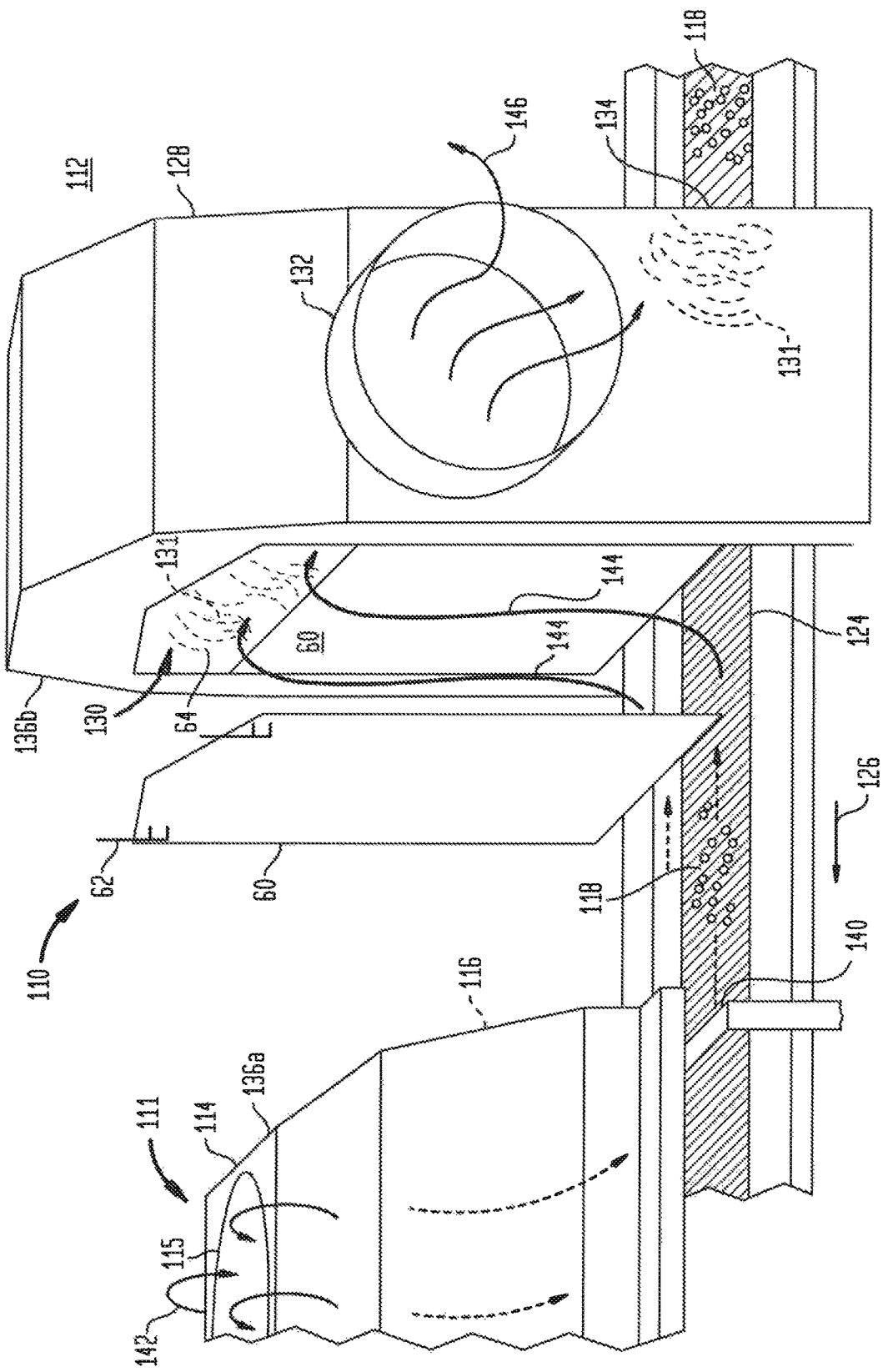

FOOD FREEZER WITH INTERNAL EXHAUST

BACKGROUND OF THE INVENTION

The present embodiments relate to tunnel food freezers that use a freezing or a cryogenic gas to chill or freeze food products, and apparatus or components of such freezers to remove cryogenic exhaust from same.

Known food freezers using cryogenic gas capture the exhaust gas in a plenum or like structure as the gas exits the freezer. Capturing the gases in this manner results in disadvantages for the freezer and exhaust operation.

Known freezers are place in plants or factories which are also refrigerated. Such freezers "pull" from four (4) to six (6) parts of room air from the customer's plant into the exhaust to maintain an exhaust temperature at plus (+) 32° F. (+0° C.) to reduce if not eliminate snow and ice accumulation in the freezer exhaust ductwork. In those plants that are refrigerated, pulling large volumes of plant air into the freezer or freezers causes the temperature in the plant room to rise, thereby necessitating additional plant cooling to maintain the plant refrigerated temperature. Such corrective or compensatory cooling of the plant air is expensive and not always possible for certain plant operators.

Removing large volumes of plant air also creates negative pressures in food plants. The negative pressures can cause the introduction of bacteria into the plants which will present food safety and sanitation issues for the plant.

Refrigerated gases, such as for example cryogenic gases or cold frozen air, exiting a freezer in large amounts will increase the risk of reduced and insufficient oxygen levels in the plant and also, reduced visibility.

The additional plant air, which is not at cryogenic temperatures, introduced with increased moisture content into the exhaust results in accumulation of snow and ice in the exhaust ducting and blowers, thereby requiring the freezer to be shut down to rid same of the unwanted frozen condensate.

It has also been difficult if not impossible to date to control the air flow(s) at an interior of the known freezers, such that the air flows move in a desired direction for purposes of chilling/freezing efficiency and cost effectiveness with respect to the freezing or cryogenic substances being used.

SUMMARY OF THE INVENTION

There is therefore provided herein a food freezer, comprising: a first housing having a first chamber arranged internally within for providing a freezing gas to a food product within the first chamber; a second housing having a second chamber arranged internally within and being in fluid communication with the first chamber for exhausting the freezing gas from the first chamber; an adjustable opening disposed in a common wall between the first and second chambers for controlling a flow of the freezing gas moving from the first chamber to the second chamber, the adjustable opening disposed to provide a flow path for the freezing gas to a region of the second chamber for exhaust from said second chamber to an area external to the first and second housings; and a gas pressure curtain comprising the exhaust and disposed at the second chamber to prevent atmosphere from the area external to the first and second housings from entering said housings.

There is also provided herein a food freezer, comprising: a first housing having a first chamber arranged internally within for providing a freezing gas to a food product within the first chamber; a second housing having a second chamber arranged internally within and being in fluid communication with the first chamber for exhausting the freezing gas from the first chamber; a baffle disposed between the first and second chambers for interrupting a flow of the freezing gas from the first chamber, the baffle disposed to provide a first opening through which the flow is directed to a region of the second chamber for exhaust from said second chamber to an area external to the first and second housings; and a gas pressure curtain comprising the exhaust and disposed at the second chamber to prevent atmosphere from the area external to the first and second housings from entering said housings.

There is further provided herein a method of exhausting freezing gas from an internal chamber to an exhaust chamber of a food freezer, comprising: disposing a baffle between the internal chamber and the exhaust chamber; interrupting a flow of the freezing gas being exhausted from the internal chamber to the exhaust chamber; providing a first opening with the baffle between the internal chamber and the exhaust chamber through which the flow is directed to a region of the exhaust chamber; and establishing a gas pressure curtain with the freezing gas at the exhaust chamber for preventing atmosphere external to the internal chamber and the exhaust chamber from entering said chambers.

BRIEF DESCRIPTION OF THE DRAWINGS

For a more complete understanding of the present invention, reference may be had to the following description of exemplary embodiments considered in connection with the accompanying drawing Figures, of which:

FIG. 2 shows a schematic top perspective view partially in cross-section of another embodiment of a food freezer with internal exhaust of the present invention.

DETAILED DESCRIPTION OF THE INVENTION

Figure 1:
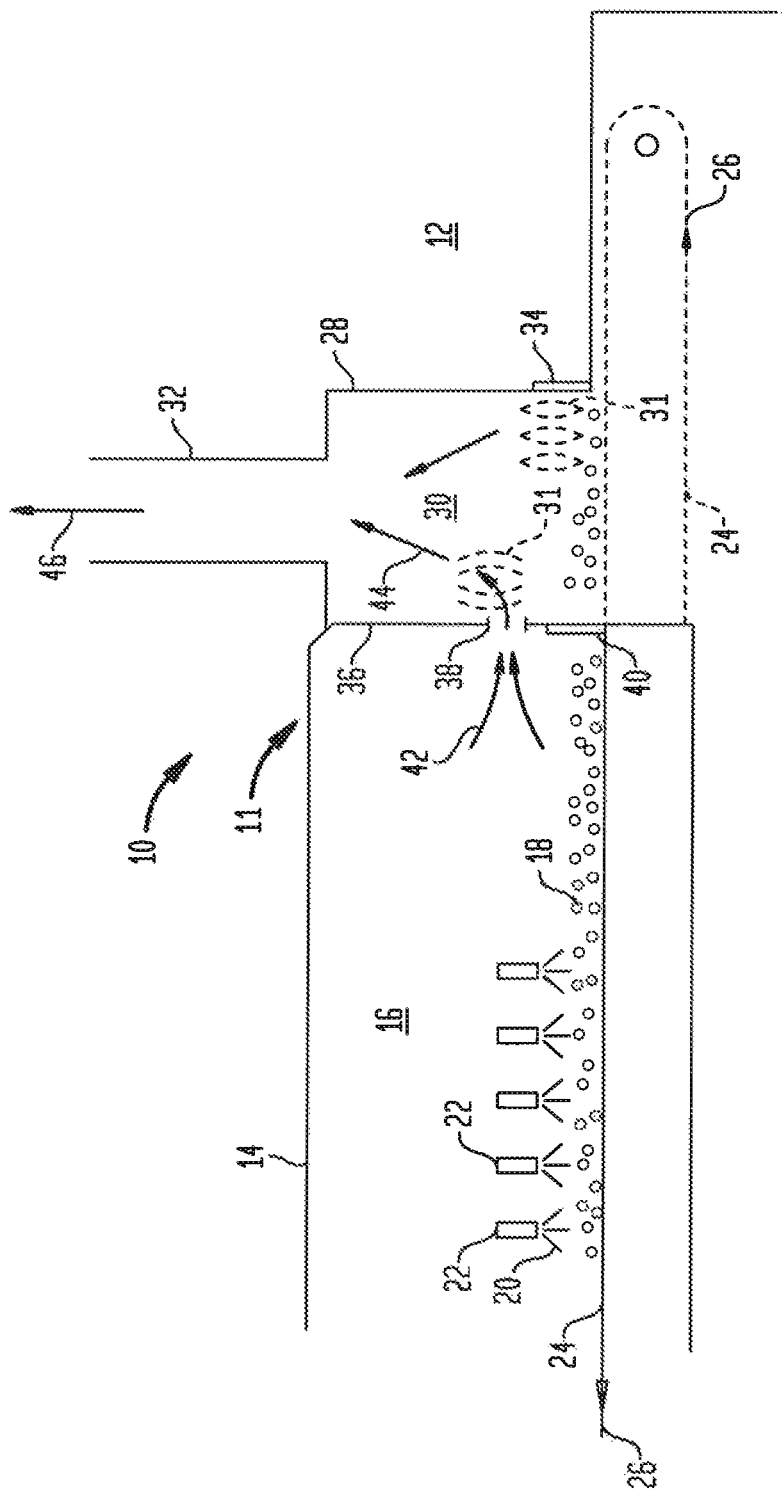
FIG. 1 shows a schematic side plan view in cross-section of an embodiment of a food freezer with internal exhaust of the present invention.

Before explaining the inventive embodiments in detail, it is to be understood that the invention is not limited in its application to the details of construction and arrangement of parts illustrated in the accompanying drawings, if any, since the invention is capable of other embodiments and being practiced or carried out in various ways. Also, it is to be understood that the phraseology or terminology employed herein is for the purpose of description and not of limitation.

In the following description, terms such as a horizontal, upright, vertical, above, below, beneath and the like, are to be used solely for the purpose of clarity illustrating the invention and should not be taken as words of limitation. The drawings are for the purpose of illustrating the invention and are not intended to be to scale.

Referring to FIG. 1, there is shown generally at 10 an embodiment of the food freezer with an internal exhaust apparatus which includes a freezer 11, such as for example a tunnel freezer, mounted for operation in a space 12 of a food freezing or processing plant, or a factory. The freezer can be used to chill, crust freeze or freeze any number of different types of food products. The freezer can be a tunnel freezer, an impingement freezer and, with certain modifications, a spiral freezer or an immersion freezer. For the sake of description and example herein, but not by way of limitation, reference herein shall be with respect to a tunnel food freezer.

The freezer 10 includes a housing 14 with an internal chamber 16 therein and in which food product 18 is subjected to a freezing gas 20 provided by spray nozzles 22. A conveyor belt 24 supports the food product 18 for transit through the internal chamber 16. The conveyor belt can be continuous, and moves in a direction shown by the arrows 26.

The freezer 10 also includes an exhaust plenum 28 having an internal space 30. In FIG. 1, the housing 14 and the exhaust plenum 28 are shown adjacent each other; and can be either releasably attached or formed as an integral unit. The internal space 30 is in communication with an exhaust stack 32 for emitting exhaust gases from the internal space and the internal chamber 16 to the atmosphere external to the plant, as will be described below. The plenum 28 includes an inlet 34 through which the conveyor belt passes into the internal space 30. The inlet may be provided with a stainless steel or a plastic curtain/curtains to prevent or limit air from the space 12 from being introduced into the internal space 30.

The housing 14 and the exhaust plenum 28 share a sidewall 36 having an adjustable opening 38 or port therein. By way of example only, the adjustable opening 38 is provided by a stainless steel sheet of material constructed as a shutter or movable door type mechanism. By way of further example, the sheet of material can have an irregular-shaped slot on each of its sides for coaction with mechanical fasteners to position the sheet to provide the opening 38. Beneath the adjustable opening 38 in the sidewall 36 there is provided another inlet 40 into the internal chamber 16. The inlet 40 may also be provided with a stainless steel or a plastic curtain/curtains to prevent the flow of freezing gas at the internal chamber 16 into the internal space 30 of the exhaust plenum 28.

A blower (not shown) may be positioned above and in communication with the exhaust stack 32 at a roof of the factory to draw or remove the freezing gas from the internal chamber 16. The removal of the freezing gas is as shown by the arrows 42 directed through the opening 38 into the internal space 30 of the exhaust plenum 28, as shown by the arrows 44, and then out of (or exhausted from) the stack 32 as shown by the arrow 46. The exhaust represented by the arrow 46 is to atmosphere external to the plant or factory in which the freezer 10 is disposed. The freezing gas 20 can be a cryogen substance selected from the group consisting of nitrogen, and carbon dioxide.

The adjustable opening 38 creates a pressure differential at where the flow 42 enters the internal space 30, i.e. a pressure curtain 31 at such locations and in the space 30 to thereby prevent warmer air or atmosphere in the factory space 12 from being pulled or drawn into the exhaust plenum 28 which would unnecessarily warm the exhaust and provide ice and snow accumulation on the belt 24 and in the plenum 28.

Referring to FIG. 2, there is shown generally at 110 another embodiment of a food freezer with an internal exhaust apparatus which includes a freezer 111, such as for example a tunnel freezer, mounted for operation in a space 112 of a food freezing or processing plant, or a factory. The freezer 111 can be used to chill, crust freeze or freeze any number of different types of food products. The freezer 111 can be a tunnel freezer, an impingement freezer and, with certain modifications, a spiral freezer or an immersion freezer. For the sake of description and example herein, but not by way of limitation, reference herein shall be with respect to a tunnel food freezer.

The freezer 110 includes a housing 114 with an internal chamber 116 therein and in which food product 118 is subjected to a freezing gas provided by spray nozzles, similar to that show in FIG. 1. A conveyor belt 124 supports the food product 118 for transit through the internal chamber 116. The conveyor belt 124 can be continuous, and moves in a direction shown by the arrows 126.

The freezer 110 also includes an exhaust plenum 128 having an internal space 130. In FIG. 2, the housing 114 and the exhaust plenum 128 are shown spaced apart from each other in order to better describe same; and can be either releasably attached or formed as an integral unit as will be further described below. The internal space 130 is in communication with an exhaust stack 132 for emitting exhaust gases from the internal space and the internal chamber 116 to the atmosphere external to the plant, as will be described below. The plenum 128 includes an inlet 134 through which the conveyor belt 124 passes into the internal space 130. The inlet 134 may be provided with a plastic curtain/curtains to prevent or limit air from the space 112 from being introduced into the internal space 130.

The housing 114 has a corresponding sidewall 136a, while the exhaust plenum 128 has a corresponding sidewall 136b. The sidewalls 136a,136b become nested against each other when the housing 114 and the exhaust plenum 128 are brought together into contact with each other for a freezing operation. The housing 114 also includes an inlet 140 to the internal chamber 116. The inlet 140 may also be provided with a stainless steel or a plastic curtain/curtains to prevent the flow of freezing gas at the internal chamber 116 into the internal space 130 of the exhaust plenum 128.

A blower 115 draws plant air from the space 112 into the internal chamber 116 as shown by the arrows 142. The air is subjected to the freezing gas within the chamber 116 to chill or freeze the product 118, after which the chilled gas exits the chamber 116 along the conveyor belt 124 toward the exhaust plenum 128.

A longitudinal member 60 constructed and referred to herein as a baffle plate (the "baffle 60") is disposed between the housing 114 and the exhaust plenum 128 above the conveyor belt 124, so that the conveyor belt with the food product 118 supported thereon can pass from the internal space 130 of the exhaust plenum into the internal chamber 116 of the housing. The baffle 60 is solid and constructed from, for example, a plastic or stainless steel, and includes mechanical fasteners 62 for releasable engagement with corresponding fasteners (not shown) arranged at an opening 64 to the internal space 130 of the plenum 128. In effect, the baffle 60 can be constructed of different sizes and/or hung at different positions at the opening 64 to provide a varying amount of clearance for access to the opening 64.

As shown in FIG. 2, arrows 144 show the flow of the exhaust along the conveyor belt 124 to further chill or freeze the food product 118 before the exhaust flow 144 is interrupted by the baffle 60 and diverted or directed upward along the baffle before being introduced through the opening 64 and into the internal space 130 of the exhaust plenum 128. The exhaust is then removed from the plenum 128 as shown by arrows 146 through a stack 132 to, for example, the roof of the plant, i.e. external to the plant space 112. As with the embodiment of FIG. 1, the freezing gas can be a cryogenic substance selected from the group consisting of nitrogen, and carbon dioxide.

The baffle 60 prevents the blower 115 from pulling air directly from the internal space 130 or the stack 132, so that any warmer air from the exhaust will not be subjected to the freezing gas and atmosphere of the internal chamber 116 whereupon frozen condensate would accumulate.

The baffle 60 can be placed at a greater height in the opening 64 to provide a labyrinth flow path for the exhaust flow proceeding to the internal space 130. In this manner of construction and arrangement of the baffle 60, the flow 144 avoids any warmer air of the space 112 which may be pulled into the inlet 134 and thereby avoid fouling the exhaust plenum 128 with frozen condensate.

The flow 144 also creates a pressure differential at where the flow proceeds upward along the baffle 60, i.e. a pressure curtain 131 at such location and at the opening 64 to the internal space 130 thereby prevents warmer air or atmosphere in the factory space 112 from being pulled or drawn into the exhaust plenum 128 which would unnecessarily warm the exhaust and cause ice and snow accumulation on the belt 124 and in the plenum 128.

It will be understood that the embodiments described herein are merely exemplary, and that a person skilled in the art may make variations and modifications without departing from the spirit and scope of the invention. All such variations and modifications are intended to be included within the scope of the invention as described herein and provided in any appended claims. It should be understood that the embodiments described above are not only in the alternative, but can be combined.

What is claimed is:

1. A food freezer (10; 110), comprising:
   a first housing (14; 114) having a first chamber (16; 116) arranged internally within for providing a freezing gas (20) to a food product (18; 118) within the first chamber (16; 116);
   a second housing (28; 128) having a second chamber (30; 130) arranged internally within and being in fluid communication with the first chamber (16; 116) for exhausting the freezing gas (20) from the first chamber (16; 116);
   an adjustable opening (38) comprising a baffle (60) disposed as a common wall (36; 136*a*, 136*b*) between the first chamber (16; 116) and the second chamber (30; 130) for interrupting and controlling a flow of the freezing gas (20) moving from the first chamber (16; 116) directly to the second chamber (30; 130), the baffle (60) constructed and arranged to provide a flow path for the freezing gas flow (20; 144) from the first chamber (16; 116) to a region of the second chamber (30; 130) and to prevent air being pulled directly from the second chamber (30; 130) into the first chamber (16; 116);
   wherein exhaust from said second chamber (30; 130) creates a pressure differential as exhaust gas pressure curtains (31; 131) disposed in the second chamber to prevent the air from the second chamber (30; 130) being pulled into the first chamber (16; 116), and to prevent atmosphere from an area external to the first housing (14; 114) and the second housing (28; 128) from entering said first and second housings (14, 28; 114, 128).

2. The food freezer according to claim 1, wherein the adjustable opening (38) comprises a mechanical member selected from the group consisting of a mechanical shutter and a movable door for providing the flow path between the first chamber (16; 116) and the second chamber (30; 130).

3. The food freezer according to claim 1, wherein the adjustable opening (38) comprises a pair of movable plates which co-act for providing the flow path between the first chamber (16; 116) and the second chamber (30; 130).

4. The food freezer according to claim 1, wherein the adjustable opening (38) comprises a stainless steel material sheet movable with respect to the wall (36; 136*a*, 136*b*) for providing the flow path between the first chamber (16; 116) and the second chamber (30; 130).

5. The food freezer according to claim 1, wherein the baffle (60) is movable with respect to the first chamber (16; 116) and to the second chamber (30; 130) for changing location of the region to which the flow of the freezing gas (20) is directed.

6. The food freezer according to claim 1, wherein the baffle (60) comprises a longitudinal member sized and shaped for the first housing (14; 114) and the second housing (28; 128).

7. The food freezer according to claim 6, wherein the longitudinal member is constructed from a material selected from the group consisting of stainless steel, plastic, and a combination of stainless steel and plastic.

8. The food freezer according to claim 1, wherein the food freezer (10; 110) is a freezer selected from the group consisting of a tunnel freezer, an impingement freezer, a spiral freezer, and an immersion freezer.

9. A method of exhausting freezing gas (20) from an internal chamber (16; 116) to an exhaust chamber (30; 130) of a food freezer (10; 110), comprising:
   disposing a common wall (36; 136*a*, 136*b*) comprising a baffle (60) between the internal chamber (16; 116) and the exhaust chamber (30; 130);
   interrupting and controlling a flow of the freezing gas (20) being exhausted from the internal chamber (16; 116) to the exhaust chamber (30; 130);
   providing a first opening at the wall (36; 136*a*, 136*b*) with the baffle (60) between the internal chamber (16; 116) and the exhaust chamber (30; 130) through which the flow is directly provided to a region of the exhaust chamber;
   moving the baffle (60) with respect to the internal chamber (16; 116) and the exhaust chamber (30; 130) for adjusting a location of the first opening for preventing air from the exhaust chamber being pulled directly into the internal chamber; and
   creating a pressure differential as exhaust gas pressure curtains (31; 131) with the freezing gas (20) at the exhaust chamber (30; 130), the exhaust gas pressure curtains in the exhaust chamber (31; 131) preventing air from the exhaust chamber being pulled directly into the internal chamber and preventing atmosphere external to the internal chamber (16; 116) and the exhaust chamber (30; 130) from entering said internal and exhaust chambers (16, 30; 116, 130).

10. The method according to claim 9, wherein the freezing gas (20) comprises a cryogenic substance.

11. The method according to claim 10, wherein the cryogenic substance is a gas selected from the group consisting of nitrogen, and carbon dioxide.

12. The method according to claim 9, wherein the food freezer (10; 110) is a freezer selected from the group consisting of a tunnel freezer, an impingement freezer, a spiral freezer, and an immersion freezer.

\* \* \* \* \*